3,153,049
RECOVERY OF PYRROLIDONE CARBOXYLIC ACID FROM WEAKLY BASIC ANION EXCHANGER ELUATES

Wilhelmus Melis, Yerres, Seine-et-Oise, and Sibrandus Kuipers, Bray-sur-Seine, Seine-et-Marne, France, assignors to Rohm & Haas Company, Philadelphia, Pa., a corporation of Delaware
No Drawing. Filed Oct. 10, 1961, Ser. No. 144,032
5 Claims. (Cl. 260—326.3)

This invention relates to the recovery of pyrrolidone carboxylic acid, particularly from the eluates of a weakly basic anion exchanger used to demineralize sugar juices.

An object of the invention is to provide a practical and economical method for preparing salts of glutamic acid from the pyrrolidone carboxylic acid which exists as an impurity in sugar juices.

In the purification of sugar juices, one of the impurities commonly encountered is pyrrolidone carboxylic acid which has the formula

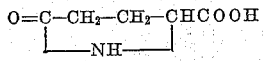

Pyrrolidone carboxylic acid (hereinafter referred to by its common abbreviation "PCA") is a potentially valuable by-product of sugar purification operations. Through a process of hydrolysis it can be converted into glutamic acid, which is a product that is finding wide application in the food and drug industry as a flavoring agent.

One of the conventional ways for purifying sugar juices is the removal of the ionic impurities by ion exchange. The demineralization process normally consists of treating the juices with a strongly acidic cationic exchanger followed by a weakly basic anion exchanger. The anionic impurities generally are removed by means of an anion exchanger in the OH$^-$ form, the exchanger picking up the PCA ions and giving up the OH$^-$ ions. The anion exchanger is then regenerated with an NaOH solution, liberating the PCA radical which immediately combines with the Na$^+$ ion from the NaOH regenerant. This formation of the sodium salt of PCA is very convenient because it is the form most suitable for the further processing steps necessary to the production of glutamic acid.

Although this conventional method functions as described, it has an inherent disadvantage in that the NaOH not only elutes the PCA from the exchanger, but also elutes many of the other ionic sugar juice impurities that have been picked up by the exchanger. As a result, the eluate contains a relatively low concentration of the sodium salt of PCA, together with many other salts that are undesired and which actually interfere with the isolation of glutamic acid of high purity. According to some estimates, the yield of glutamic acid is only about 50% of that which would be available if all the PCA in the eluate were converted to glutamic acid.

An initial effort to overcome the described deficiency of the prior art method was to regenerate the anion exchanger with ammonium hydroxide, followed by recovery of the NH$_4$OH through treatment of the eluate with milk of lime. But this, in turn, presents serious difficulties in connection with the PCA recovery. When the PCA is thus recovered in the form of its NH$_4$ salts, about 40% of the ammonia used for regeneration is unrecoverable by the initial (sugar) processors since it is chemical bound in the eluates that are shipped to the plant of the glutamic acid manufacturer. Aside from the problems this causes in the glutamic acid plant, the process is unattractive because the first processor has to make up for the losses of large quantities of ammonia each time.

Another attempt to overcome the described deficiency of the prior art method was to recover the PCA in the form of its calcium salt. But this requires the provision of a filtration operation at the sugar mill, or other initial processor, to separate the excess milk of lime and precipitated calcium salts of sugar juice impurities from the eluates prior to evaporation. In addition, another filtration step is required in the glutamic acid plant to filter off the Ca(OH)$_2$ formed when adding to the eluates the NaOH required in the hydrolysis.

In the face of these and other unsatisfactory attempts to solve the problem, the present invention has overcome the obstacles described above and has provided a completely satisfactory, commercially operative and practical method. In accordance therewith, the anion exchangers which are laden with the various anionic sugar juice impurities are treated with anions of an acid which is stronger than PCA, e.g., chloride ions. The stronger anions displace the PCA ions which then combine with the cations present and are passed off into the effluent. Thus, if NaCl is used to furnish the stronger anions, the sodium ions will combine with the PCA radical to form the sodium salt of PCA which, incidentally, is the material most suitable for further processing to glutamic acid.

In actual commercial practice, it is believed that the various anionic groups in the solution to be purified by the anion exchanger adhere to the resins in the bed in the order of their acid strength. Acid radicals of the stronger acids present become ionically bonded to the resin at the top of the bed or column, with the acid radicals of the weaker acids in the center section of the bed and the radicals of the still weaker acids near the bottom of the bed. The acid strength of the PCA relative to the acid strengths of the other sugar juice impurities is such that the PCA generally is bound to the anion-exchange resin near the bottom of the bed. Thus, when an anion of a stronger acid is supplied to the fully or partially exhausted anion-exchange bed, as by the use of an acidified solution of NaCl, the chloride ions, being acid radicals of a strong acid, will displace from the top of the resin bed those acid radicals which are weaker than the chloride ions. The displaced radicals, in turn, will displace from each of the successive lower portions of the bed any progressively weaker acid radicals which may be present. Thus, in effect, a chain reaction takes place which finally results in the elution from the bed of the weakly acid anions, those anions ending up in the eluate as the sodium salt.

In accordance with this invention, an eluate fraction can be obtained which:

(1) Contains at least 1.5 times the concentration of the (sodium) salt of PCA obtainable with previous techniques, such as the elution with NaOH;

(2) Contains at least 1.2 times the quantity of the (sodium) salt of PCA obtainable with previous techniques;

(3) Has a high purity, with respect to the (sodium) salt of PCA since it does not contain many of the other sugar juice impurities normally encountered in anion-exchange resin eluates, and (4) Yields, after further processing, a glutamic acid of high quality than heretofore obtainable with existing techniques for processing the (sodium) salt of PCA obtained from anion-exchange resin eluates.

EXAMPLE I

To test the efficiency of the present invention, thirteen cycles were performed on sugar juices which previously had been passed through a column of a strongly acid cation exchanger in the H$^+$ form to remove cations, such as Ca, Na and K. In each cycle the juices were passed over an anion-exchange column containing four liters of the OH$^-$ form of a resin made in accordance with the disclosure in U.S. Patent No. 2,675,359. A complete cycle consisted of:

(1) Saturating the resin with sugar juice impurities by passing the juice over the resin column at a rate of 1.5 gallons per minute (g.p.m.) per cubic foot (cu. ft.) of resin;

(2) Sweetening off the resin column;

(3) Recovering the PCA by displacing it from the column with an acidified NaCl solution at a rate of 0.3 g.p.m. per cu. ft. of resin;

(4) Rinsing out the NaCl solution with water at a rate of 0.3 g.p.m. per cu. ft. of resin;

(5) Regenerating the resin column with $NH_4OH$ at a rate of 0.3 g.p.m. per cu. ft. of resin;

(6) Water-rinsing the column at a rate of 0.3 g.p.m. per cu. ft. of resin;

(7) Water-rinsing the column at a rate of 1.2 g.p.m. per cu. ft. of resin;

(8) Backwashing the column with water.

Table I, which follows, summarizes the results of these runs:

taining any of the PCA-Na salt. The following 3450 ml. of eluate was collected; it contained 135 grams of the PCA-Na salt. The concentrate of this eluate had a viscosity of only one-fifth that encountered in conventional PCA concentrates, thus improving the filtering and crystallizing characteristics of this concentrate. This, in turn, resulted in the ultimate isolation of glutamic acid in the form of white crystals, a superior product to the yellow-brown crystals obtained with the conventional elution techniques (as with NaOH as the regenerant for the anion exchanger).

Following the practice of this invention, the (sodium) salt of the PCA which is obtained is hydrolyzed, preferably at a pH of about 11.0. Next, HCl is added to the hydrolyzed mixture until the iso-electric point of glutamic acid (pH—3.2) is reached, resulting in the crystallization of l-glutamic acid.

It will be apparent to those skilled in the art that a number of modifications may be made to the disclosed invention without departing from the spirit or scope thereof. For example, although the sodium salt of PCA

Table I

| Cycle No. | Regeneration Condition | Resin Capacity in Grams of Sugar Juice Impurities Absorbed per l. Resin | PCA Recovery Solution, Acidified Excepting Nos. 3 and 4 | Gram PCA Recovered | Concentration PCA in Recovered Eluate | Percent Yield of Glutamic Acid Upon Crystallization |
|---|---|---|---|---|---|---|
| 1 | 53 g. $NH_4OH$, 100%, per l. resin (5% sol.). | | 62.5 g. NaCl per l. resin (5% sol.). | 183 | 4.57 | |
| 2 | ---do--- | | 56.2 g. NaCl per l. resin (5% sol.). | 175 | 4.52 | |
| 3 | ---do--- | | 56.2 g. NaCl per l. resin (5% sol.). | | | |
| 4 | ---do--- | | 56.2 g. NaCl per l. resin (2% sol.). | | | |
| 5 | ---do--- | | 56.2 g. NaCl per l. resin (4% sol.). | 172 | 3.60 | |
| 6 | ---do--- | | ---do--- | 160 | 3.50 | |
| 7 | ---do--- | | 56.2 g. NaCl per l. resin (5% sol.). | 155 | 2.75 | |
| 8 | ---do--- | 297 | ---do--- | 175 | 3.43 | 56.5 |
| 9 | ---do--- | 308 | ---do--- | 161 | 3.04 | 56.5 |
| 10 | ---do--- | 230 | ---do--- | 165 | 3.01 | |
| 11 | 79 g. $NH_4OH$, 100% per l. resin (5% sol.). | 340 | ---do--- | 179 | 3.39 | 61.2 |
| 12 | 53 g. $NH_4OH$, 100% per l. resin (5% sol.). | 260 | ---do--- | 168 | 3.73 | 61.2 |
| 13 | ---do--- | 300 | ---do--- | 166 | 3.33 | 61.2 |

A comparison was made of the average results obtained in the course of runs 8 through 13 in Table I with those obtained using NaOH to elute the PCA. It is as follows:

Table II

| | Elution Technique | |
|---|---|---|
| | Acidified NaCl Soln. | NaOH Soln. |
| Conc. PCA in Eluate, percent | 3.32 | 2.3 |
| Yield PCA, g. | 169 | 130 |
| Yield glutamic acid (crystallized), percent | 58.8 | 50 |
| Yield glutamic acid, g. | 100 | 65 |

EXAMPLE 2

Through a column containing 3200 ml. of a weakly basic anion-exchange resin in the $OH^-$ form, made in accordance with the disclosure of U.S. Patent 2,675,359, there were passed 80 liters of sugar juice (14.0% Brix, 12.9% surcrose, 92% purity) which had previously been passed through a column of a strongly acid cation exchanger to arrive at a purity of 99% in the treated juice.

After sweetening off the anion-exchange resin column, 1500 ml. of a 10% NaCl solution, acidified to a pH of 2.0 with $H_2SO_4$, were passed through the bed. The first 1200 cc. of the eluate were discarded as not conis preferred as the end product, and, therefore, it is logical to the NaCl or some other sodium salt of a strong acid as the regenerant, salts of strong acids with other metal cations, such as K, can be employed. Nor need the strongly acidic anions be limited to the preferred Cl ions that were used in the examples. As pointed out above, almost any acidic anion which is stronger than PCA would be suitable. Similarly, the resin used need not be the particular weakly basic anion-exchange resin identified in the examples, as many other suitable weakly basic anion-exchange resins would function with more or less equivalent success.

Besides the numerous advantages described above, the invention makes possible practically complete recovery of the $NH_4OH$ which is used to regenerate the anion exchanger after PCA recovery. This important secondary result of the invention is due to the fact that no $NH_4OH$ is lost, either chemically bound or in free form, with the PCA eluate.

We claim:

1. A process for the recovery of pyrrolidone carboxylic acid from sugar juices, containing such acid, which comprises passing the juices over a column of a weakly basic anion exchanger in the $OH^-$ form, then passing over the exchanger an acidified solution of a salt of a mineral acid, whereby the anion exchanger first picks up the pyrrolidone carboxylic acid anions and then selectively releases those anions into one of the eluate fractions as the acidified salt solution courses through the column.

2. The process of claim 1 in which the sugar juices are first passed over a strongly acid cation exchanger in the H+ form and then are passed over the weakly basic anion exchanger, followed by the other steps of claim 1.

3. The process of claim 1 in which the salt is a chloride.

4. The process of claim 1 in which the salt is sodium chloride.

5. The process of claim 1 in which the salt solution is acidified with $H_2SO_4$.

References Cited in the file of this patent

UNITED STATES PATENTS

| | | |
|---|---|---|
| 2,742,482 | Heegard | Apr. 17, 1956 |
| 2,785,180 | Julsingha | Mar. 12, 7957 |